United States Patent [19]

Hamilton

[11] Patent Number: 4,846,979
[45] Date of Patent: Jul. 11, 1989

[54] ALGACIDE AND METHOD FOR TREATMENT OF WATER

[76] Inventor: Jock Hamilton, 1951 Malcom Ave., Los Angeles, Calif. 90025

[21] Appl. No.: 84,454

[22] Filed: Aug. 12, 1987

Related U.S. Application Data

[63] Continuation of Ser. No. 772,028, Sep. 3, 1985, abandoned.

[51] Int. Cl.$^4$ ................................................ C02F 1/50
[52] U.S. Cl. .................................... 210/754; 210/764; 210/765; 71/67; 134/2; 134/26
[58] Field of Search ............... 210/697, 752, 754, 764, 210/765; 71/67; 134/2, 3, 26, 28, 29

[56] References Cited

U.S. PATENT DOCUMENTS

| | | | |
|---|---|---|---|
| 3,975,271 | 8/1976 | Saunier et al. | 210/753 X |
| 4,388,194 | 6/1983 | Hills | 210/697 |
| 4,436,628 | 3/1984 | Ralston et al. | 210/697 |
| 4,588,506 | 5/1986 | Raymond et al. | 210/764 X |
| 4,643,835 | 2/1987 | Koeplin-Gall et al. | 210/764 X |
| 4,673,509 | 6/1987 | Davis et al. | 210/764 X |

OTHER PUBLICATIONS

Strauss, *Chem. Abst*, vol. 53 (1951), H866f.
*The March Index* (1983), 9063, p. 1322.
Bringmann et al., *Chem Abst.*, vol. 89 (1978), 191911t.

*Primary Examiner*—Tom Wyse
*Attorney, Agent, or Firm*—Plante, Strauss, Vanderburg

[57] ABSTRACT

There is disclosed a chemical algacide composition, and method for its use, to prevent and remove yellow algae deposits in swimming pools, spas and simlar bodies of water. The algacide composition comprises from 5 to about 12.5 weight percent of a soluble polyphosphate and the balance of an alkali metal or ammonium bromide. The successful use of the algacide composition requires the presence of an oxidizer which is effective to convert the bromide to bromine. This conveniently can be the oxidizer which is used in the water, e.g., chlorine or sodium hypochloride in swimming pools and spas, or can be an additionally added oxidizer, such as a persulfate, etc. The method comprises the addition of the algacide composition to the water at a dosage sufficient to provide at least 0.5 ppm of the soluble bromide in the water, and to maintain an active oxidizer in the water.

6 Claims, No Drawings

ALGACIDE AND METHOD FOR TREATMENT OF WATER

BACKGROUND OF THE PRIOR ART

1. Field Of The Invention

This invention relates to an algacide and, in particular relates to an algacide useful in preventing the growth of algae in swimming pools and spas and to prevent and remove yellow algae stains from surfaces of the pools and spas.

2. Brief Statement Of The Prior Art

Many oxidizing agents have been used with limited success to prevent the growth of algae in swimming pools and spas and to prevent the formation of yellow algae deposits on the surfaces of the pools and spas. Examples of agents which have been used are: chlorine, salts and compounds of metals such as silver and copper, quaternary salts, polyquaternary salts, simazines and others. Unfortunately, the microorganisms, after an exposure period of 1 to 2 years, have adapted to these agents, and algae have been reported growing in waters containing 20 ppm chlorine, which is approximately 10 to 15 times the normal dosage level of chlorine in pool and spa waters.

I have discovered the bromine is a very effective algacide in pools and spas. My early work revealed that bromine was effective at dosages as low as 0.1 ppm. I have now used bromine as an algacide for slightly over two years, and I have found that algae do not adapt to the bromine or acquire a tolerance for this agent.

My use with a bromide algacide, however, has revealed concentration limits to the polyphosphate coadditive. In my initial work, I used mixtures which contained 25 percent of tetra sodium polyphosphate. This mixture caused clouding of the water when used on a regular maintenance program, in which the composition was added as needed to maintain the bromine content in the effective range. In my initial work, the composition was also added at a large excess, however, it was found that this caused depletion of chlorine from the pool water, and the present method of this invention comprises the frequent addition of limited dosages of the composition to the water.

DESCRIPTION OF PREFERRED EMBODIMENTS

The algacide of this invention comprises a mixture of two active agents which are a water soluble bromide, such as an alkali metal, alkaline earth metal or ammonium bromide, and a water soluble polyphosphate, such as an alkali metal or ammonium polyphosphate. Of these, the alkali metal salts, particularly potassium and sodium are preferred, and of the alkali metal salts, sodium is most preferred for it availablity and low cost. Ammonium salts, while operable, are not preferred because of their cost and odor.

The bromide is an effective source of active bromine when contacted with a water soluble oxidizing agent having sufficient oxidation potential to oxidize bromide ions in dilute solutions, i.e., an oxidation potential more negative than $-1.1$ volts in dilute aqueous solutions, with respect to a standard hydrogen electrode. Examples of suitable oxidizing agents which are maintained in the water by the method of the invention comprise: chlorine, soluble hypochlorides, Oxone a commercial product of E. I. DuPont de Nemoures & Company, soluble persulfates such as sodium or potassium persulfate, monoperoxyphthalate hexahydrate, etc. The selected oxidizer is maintained in the treated water at a concentration from about 1 to about 200 ppm, sufficient to effect the oxidation of the bromide additive.

A water soluble polyphosphate is included in the algacide composition at a concentration from 5 to about 15 parts for each 100 parts of the soluble bromide. Preferably the concentration is from 7 to 12 parts for each 100 parts of bromide. The polyphosphate functions as a non-foaming surfactant, and as an inhibitor of calcium scale formation on the surfaces of the pool or spa. When used in pools or spas with surfaces which have been stained by yellow algae deposits, the polyphosphate in the algacide composition is effective to remove the scale deposits.

In the method of the invention, the bromide composition and the oxidizer are maintained in the water at concentrations which are effective to maintain the bromine in the water at a concentration from 0.5 to about 100 ppm. When the algacide is used in swimming pools and spas, the bromide algacide composition and oxidizer are maintained at concentrations which are effective to maintain bromine in the water at a concentration from 0.5 to about 50 ppm. Higher concentrations of bromine are not preferred as the bromine at levels above 50 ppm tend to impart a green color to the water. While higher concentrations of bromine can be used if the color is not objectionable, e.g., for industrial uses such as cooling tower water, concentrations above about 100 ppm are not practical as no significant improvement in activity is achieved by using higher concentrations of bromine.

The amount of the algacide composition which is added to the water depends somewhat on the use and prior treatments of the water. In most applications the bromide composition can be added in excess to the water, and the amount of the oxidizer which can be periodically added to the water can be limited to control the amount of bromine in the water to the aforementioned concentrations—from 1 to about 100, preferably from 5 to about 20, ppm. The oxidizer such as sodium hypochlorite can be added to the water in periodic intervals, e.g., once every 12 to 72 hours, preferably once every 36 to 56 hours. The amount of the bromide composition which is initially added can be sufficient to provide bromine release over a period from about 5 to 30 days, preferably from 7 to about 14 days.

If desired, the algacide composition and the oxidizer can both be added continuously or at frequent intervals to maintain a relatively constant concentration of both of these additives. This is typically the application used in swimming pools and spas in which chlorine or a soluble hypochlorite is added to maintain a chlorine concentration from 0.5 to about 2 ppm. In such applications, the algacide composition can be added in the aforementioned intervals and dosages.

Alternatively, the water in most pools and spas contains chlorione or a hypochlorite at a concentration from about 0.5 to about 5 ppm, expressed as chlorine, as a general purpose microcide. In such applications, the chlorine can be maintained in excess, and the algacide composition can be periodically added in small amounts, as required to maintain the desired bromine concentration to provide the desired algacide activity. In such applications, the algacide composition could be added to the water at intervals of 12 to 72, preferably 36 to 56, hours, and in amounts to provide from 5 to about 15 ppm of the water soluble bromide in the water with each addition.

The invention will now be described with reference to the following examples which will also serve to demonstrate the results obtained when practicing the invention.

EXAMPLE 1

A swimming pool which is stained with yellow algae deposits is treated with the algacide composition of the invention. The history of the pool reveals that chlorine has been maintained in the pool at a level of about 1 ppm, and the chlorine is continued to be maintained at this level throughout the test period with the algacide composition. Despite this concentration of chlorine in the past, the algae have adapted and grown to the level where objectionable yellow stains have formed, particularly about the shady wall of the pool.

The following algacide composition is added to the swimming pool water:

TABLE 1

| Ingredient | Concentration |
|---|---|
| Sodium Bromide | 90% (by weight) |
| Tetrasodium Pyrophosphate | 10% |

The algacide composition is added to the swimming pool water on a continuous basis at an amount of 3 full caps of its container (1 pound) at 48 hour intervals (every other day) and the chlorine is maintained in the swimming pool by the addition of 2 gallons liquid chlorine at the same time as the addition of the algacide composition.

The swimming pool is inspected on a regular basis and it is observed that the yellow stains began to disappear after the second day of treatment. After twenty days of treatment, the yellow stains have been completely removed from the pool.

The aforementioned procedure is followed with the following algacide composition:

TABLE 2

| Ingredient | Concentration |
|---|---|
| Sodium Bromide | 75% (by weight) |
| Tetrasodium Pyrophosphate | 25% |

It is observed that the water in the swimming pool becomes quite cloudy after the tenth day of treatment. When the addition of the algacide composition is discontinued, the water again becomes clear, however, after about four weeks, yellow algae stains again form of the surfaces of the pool.

When the addition of the algacide composition of Table 2 and the chlorine are added to the swimming pool water over a period slightly in excess of one year, the algae deposits do not reappear. Similar results, over a several month period, are observed using the treatment with the algacide composition of Table 1.

EXAMPLE 2

In another experiment, a swimming pool having a capacity of 10,000 gallons of water, and a history of algae growth in which many treatments had been attempted without success. The pool is treated by the addition of 3 pounds of the algacide composition of Table 1. An oxidizer, Trichloro S Triazine Trione, commercially available from Monsanto Chemical Company, is added to the water at a dosage of one pound twice a week, at regular intervals. The algacide composition is active and the bromine concentration is thereby maintained in the water at a value from 0.5 to about 1 ppm throughout a six week period. At the end of the sixth week, the addition of the algacide composition is repeated and the daily addition of the chlorine oxidizer is continued, using slowly dissolving tablets. The pool remains free of algae growth and no yellow stains are observed throughout an extended test period of over two years.

EXAMPLE 3

The procedure of Example 2 is repeated with the composition of Table 2, however, liquid sodium hypochlorite is added to the pool rather than Trichloro S Triazine Trione. The liquid sodium hypochlorite (aqueous concentration of about %) is added to the pool at regularly spaced intervals twice a week, and the algacide composition is added in amounts of two pounds every six weeks. The pool remains free of algae growth throughout the test period.

The invention has been described with reference to the illustrated and presently preferred embodiments. It is not intended that this disclosure of the presently preferred embodiments be unduly restricting. Instead, it is intended that the invention be defined by the reagents and method steps, and their obvious equivalents, set forth in the following claims:

What is claimed is:

1. The method of treating swimming pools and spas characterized by yellow algae growths and stains to prevent said growth and remove said stains which comprises:
   (a) adding to the water in said pool or spa, an effective amount of an algicide composition consisting essentially of an alkali metal, alkaline earth metal or ammonium bromide in an amount from 1 ounce to 3 pounds per 10,000 gallons of water
   (b) adding to said water, a water soluble oxidizer having an oxidation potential effective to convert bromide ions to bromine in dilute aqueous solutions, while
   (c) controlling the addition of said algicide composition by adding said algicide composition in limited, periodic amounts to maintain said bromine concentration in the water at a level from about 0.5 to about 100 ppm bromine.

2. The method of claim 1 wherein said polyphosphate is premixed into said algicide composition prior to addition of said algicide composition to said water.

3. The method of claim 1 wherein said oxidizer is chlorine which is maintained in said water at a concentration from 1 to 10 ppm.

4. The method of claim 1 wherein said algicide composition is added to excess quantities to said water and the release of bromine in said water is controlled by the limited additions of oxidizer which are added to the water at intervals of once every 12 to about 72 hours.

5. The method of claim 4 wherein said algicide composition is added to the water in quantities from 1 to about 5 ounces at each addition.

6. The method of claim 1 wherein both the algicide composition and said oxidizer are added to the water at intervals no longer than once every 12 to 72 hours, and at dosages for each addition which are effective to maintain the bromine in the water at the aforesaid concentration.

* * * * *

UNITED STATES PATENT AND TRADEMARK OFFICE
CERTIFICATE OF CORRECTION

PATENT NO. : 4,846,979
DATED : July 11, 1989
INVENTOR(S) : Jock Hamilton

It is certified that error appears in the above-identified patent and that said Letters Patent is hereby corrected as shown below:

In column 4, claim 1, line 38, after "water" please insert --(b) adding to said water an alkali metal, alkaline earth metal or ammonium polyphosphate in proportions of from 5 to about 15 weight parts polyphosphate per each 100 weight parts of bromide compound; and--

Signed and Sealed this

Twelfth Day of April, 1994

Attest:

Attesting Officer

BRUCE LEHMAN

Commissioner of Patents and Trademarks